(12) United States Patent
Matsumoto et al.

(10) Patent No.: US 6,577,803 B2
(45) Date of Patent: Jun. 10, 2003

(54) OPTICAL FIBER ARRAY HAVING AN OFFSET ANGLE BETWEEN AN END PORTION OF A SUBSTRATE PORTION HOUSING AT LEAST ONE STRAIGHT GROOVE AND THE AXIS OF THE HOUSED STRAIGHT GROOVE HOLDING AT LEAST ONE OPTICAL FIBER THEREIN

(75) Inventors: Akira Matsumoto, Nagoya (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 7 days.

(21) Appl. No.: 09/818,980

(22) Filed: Mar. 27, 2001

(65) Prior Publication Data

US 2001/0026673 A1 Oct. 4, 2001

(30) Foreign Application Priority Data

Mar. 29, 2000 (JP) .................................. 2000-091684
Feb. 9, 2001 (JP) .................................. 2001-034512

(51) Int. Cl.[7] .................................................. G02B 6/00
(52) U.S. Cl. .............................. 385/137; 385/65; 385/83
(58) Field of Search .............................. 385/136, 137, 385/65, 78, 80, 83, 95–99, 77

(56) References Cited

U.S. PATENT DOCUMENTS 5,214,730 A * 5/1993 Nagasawa et al. ........ 385/77 X
6,160,947 A * 12/2000 Osugi et al. ................ 385/137

* cited by examiner

*Primary Examiner*—Lynn D. Feild
*Assistant Examiner*—Son V. Nguyen
(74) *Attorney, Agent, or Firm*—Burr & Brown

(57) ABSTRACT

An optical fiber array is provided which allows each optical fiber to be rarely sheared down by the action of a stress and inhibits the reflection of an optical signal on the interface at its joint and a method of fabricating the optical fiber array is also provided.

The angle between the imaginary line L which extends linearly along the proximal end of straight grooves (7) for clamping the stripped end portion (2a) of the optical fibers (2) provided in a fiber clamping member (2) to align the distal ends of the optical fibers (2) at uniform pitch and the axes of the straight grooves (7) ranges from 45 degrees to 85 degrees. Also, the front end (1a) of the fiber clamping member (1) which serves as a joining end is arranged in parallel with the imaginary line L.

6 Claims, 3 Drawing Sheets

(a)

(b)

(c)

OPTICAL FIBER ARRAY HAVING AN OFFSET ANGLE BETWEEN AN END PORTION OF A SUBSTRATE PORTION HOUSING AT LEAST ONE STRAIGHT GROOVE AND THE AXIS OF THE HOUSED STRAIGHT GROOVE HOLDING AT LEAST ONE OPTICAL FIBER THEREIN

BACKGROUND OF THE INVENTION

1. Field of the Invention

The present invention relates to an optical fiber array for use in optical communications and particularly to an optical fiber array which has a fiber clamping member mounted to the distal end thereof for ease of connection with an optical element or the like and a method of fabricating the optical fiber array.

2. Description of the Related Art

An example of a fiber clamping member mounted to the distal end of optical fibers for connection with an optical element is disclosed in Japanese Patent Publication No. 2,824,177. This comprises a base which has a plurality of parallel straight grooves provided therein for accommodating the stripped end portions of optical fibers and a sheathed portion holding plate which has a recess therein for holding the sheathed portions of the optical fibers and mounted next to the straight grooves on the base. The straight grooves extend at a right angle to the front end of the base which is joined to an optical element or the like.

As the optical fibers have been inserted into the recess of the sheathed portion holder from the rear side of the fiber clamping member and accommodated at their stripped end portions in the corresponding straight grooves, the straight grooves surface is enclosed with a clamping plate thus forming an optical fiber array. Problems that the Invention is to solve However, in the conventional arrangement, the imaginary line extending along the insertion end of the straight grooves for the optical fibers is at a right angle to the straight grooves or namely the axes of the optical fibers. Accordingly, when any of the optical fibers receives a significant stress, it may be sheared down by the action of the stress. Also, as the front end of the base to be joined to the optical element extends at a right angle to the axes of the optical fibers, the reflection of an optical signal on the interface at the joint may generate an adverse artifact such as a noise.

SUMMARY OF THE INVENTION

It is hence an object of the present invention, in view of the above problems, to provide an optical fiber array in which each optical fiber is protected from shearing stresses and inhibits the reflection of an optical signal on the interface at its joint and a method of fabricating the optical fiber array.

For solving the above drawbacks, in accordance with an embodiment of the present invention, an optical fiber array includes a fiber clamping member for clamping the stripped end portions of optical fibers in corresponding straight grooves and simultaneously holding the sheathed portion of the optical fibers close to the stripped end portions of the optical fibers to align the distal ends of the optical fibers. An angle between an imaginary line extending linearly along the insertion end of the straight grooves housing the stripped end portions of the optical fibers and the axes of the straight grooves ranges from 45 degrees to 85 degrees.

According to another aspect of the present invention, the angle between the front end of the optical fiber clamping member arranged flush with the distal ends of the optical fibers and the axes of the straight grooves ranges from 45 degrees to 85 degrees.

According to yet another aspect of the present invention, the straight grooves are uniform in the length.

According to still another aspect of the present invention, the rear end of the optical fiber clamping member extends in parallel with the imaginary line along the insertion end of the straight grooves housing the stripped end portions of the optical fibers.

According to another embodiment of the present invention, there is provided a method of fabricating an optical fiber array. The optical fiber array includes a fiber clamping member for clamping the stripped end portions of optical fibers in corresponding straight grooves and simultaneously holding the sheathed portion close to the stripped end portions of the optical fibers to align the distal ends of the optical fibers. The method includes the steps of: preparing a wafer in which groups of straight grooves extending in parallel with each other are provided and step surfaces extending in parallel with each other are provided at an angle of 45 to 85 degrees to the straight grooves; mounting on each of the step surfaces a continuous member of sheathed portion holders which has a corresponding number of recesses provided at locations thereof opposite to the straight grooves for accommodating the sheathed portions of the optical fibers of the groups; bonding each the continuous members of sheathed portion holders to the corresponding step surface at a given location and cutting the wafer together with the continuous members of sheathed portion holders in parallel with the step surfaces and the straight grooves to separate the fiber clamping member into a chip form; and mounting and clamping the optical fibers to the optical fiber clamping member so as to align the distal ends of the optical fibers.

BRIEF DESCRIPTION OF THE DRAWINGS

FIG. 1 illustrates an optical fiber array showing one embodiment of the present invention, in which FIG. 1a is a plan view, FIG. 1b is a front view, and FIG. 1c is a side view;

FIG. 2 illustrates a wafer provided with grooves and bonded with sheathed portion holders, in which FIG. 2a is a perspective view, FIG. 2b is a plan view, and FIG. 2c is a side view;

FIG. 4 is an explanatory view showing the cross sectional length along the diameter of optical fibers, in which FIG. 4a illustrates the cross section at a right angle and FIG. 4b illustrates the cross section at an angle.

DETAILED DESCRIPTION OF THE INVENTION

Figure 1:
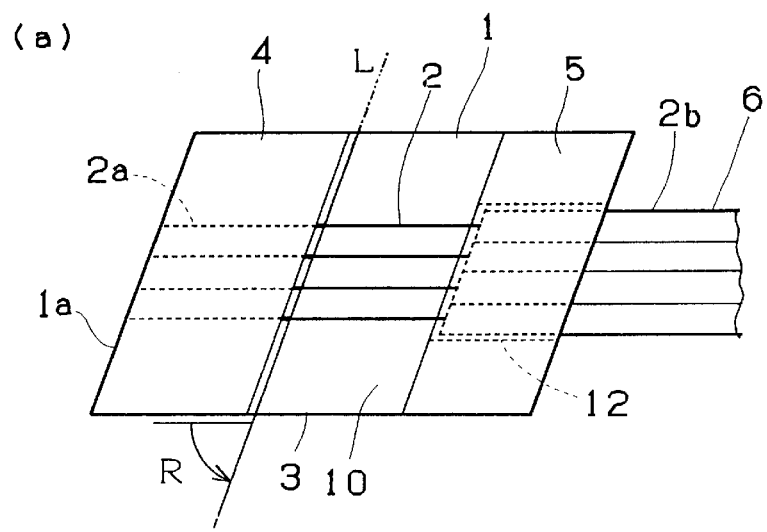
Figure 1:
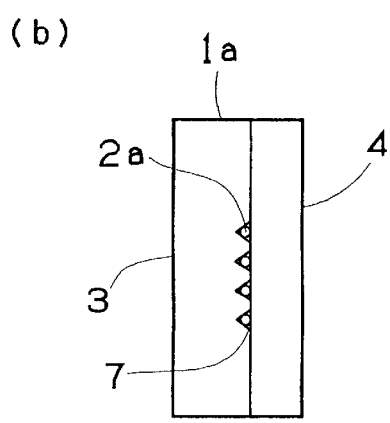
Figure 1:
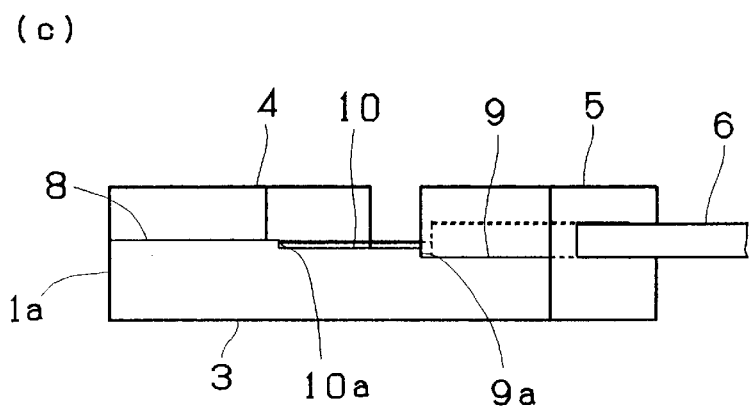

The present invention will be described in more detail referring to the accompanying drawings. FIG. 1 illustrates an optical fiber array according to the present invention, in which FIG. 1a is a plan view, FIG. 1b is a front view, and FIG. 1c is a side view. Shown are a fiber clamping member 1, optical fibers 2, and an optical fiber ribbon 6.

The fiber clamping member 1 comprises a base 3, a clamping plate 4 mounted at a given location to the base 3, and a sheathed portion holder 5. As shown, the entire structure is arranged of substantially a rhombic shape. The base 3 has a fiber clamping surface 8 in which the stripped end portions 2a of the optical fibers 2 are clamped at intervals of a desired pitch. The base 3 includes a fiber holding surface 9 in which the sheathed portions 2b of the optical fibers 2 are held. An optical fiber running space 10 is provided between the two surfaces 8 and 9.

The fiber clamping surface 8 is provided at the distal end of the base 3 which is joined to an optical element (not shown) and has a plurality of parallel straight V-grooves 7 for clamping the stripped end portions 2a of the optical fibers 2 at the pitch pertinent to the optical element. As the stripped end portions 2a of the optical fibers 2 have been placed on the grooves 7, a clamping plate 4 shaped for matching the fiber clamping surface 8 is bonded to the fiber clamping surface 8. In this embodiment, four of the straight grooves 7 are provided for accommodating four of the optical fibers 2 respectively. It is noted that the angle R between the axis of any groove 7 and the imaginary line L extending along the rear end of the fiber clamping surface 8, from which the optical fibers are inserted into the straight grooves 7, ranges from 45 to 85 degrees. The straight grooves 7 are identical in the length. As a result, the distal end of the base 3 extends in parallel with the imaginary line L and an angle between the distal end of base 3 and the axis of the straight groove 7 is within a range of 40 to 85 degrees.

The fiber holding surface 9 is flat, on which the sheathed portions 2b of the optical fibers 2 are arranged. The stripped end portions 2a of optical fibers 2 are clamped on the fiber clamping surface 8. The sheathed portions 2b are accommodated and held in a recess 12 provided in the sheathed portion holder 5. The sheathed portion holder 5 is shaped for matching the fiber holding surface 9 and the recess 12 provided in its lower side center has a rectangular shape in the cross section sized for accommodating a particular number of the optical fibers 2 at the diameter of the sheathed portion 2b. As their sheathed portions 2b are held in the recess 12, the optical fibers 2 are anchored at both, left and right, ends to the base 3 and extend as the optical fiber ribbon 6.

The fiber running space 10 has a surface thereof arranged lower at a first step 10a than the fiber clamping surface 8. The fiber holding surface 9 is arranged lower at a second step 9a than the fiber running space 10. Accordingly, the cores or stripped end portions 2a of the optical fibers 2 held on the fiber holding surface 9 can be inserted into the straight grooves 7 without being angled.

When the clamping surface 8 and the fiber holding surface 9 are arranged in parallel with each other, i.e. the imaginary L extends in parallel with the sheathed portion holder 5, the fiber running space 10 may be eliminated.

More specifically, the optical fiber array is implemented by the optical fibers installed at their distal ends to the fiber clamping member 1. A procedure of the installation is then explained. The optical fiber ribbon 6 of which the leading end is stripped to a given length to expose the stripped end portions 2a of the optical fibers 2 is inserted into the recess 12 of the sheathed portion holder 5 from the rear side of the fiber clamping member 1 until the stripped end portions 2a are accommodated in the corresponding straight grooves 7. Then, the clamping plate 4 is bonded to the fiber clamping surface 8.

Figure 4:
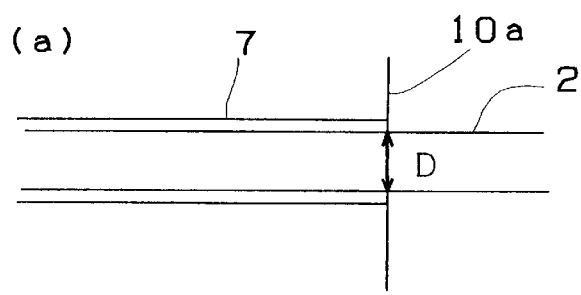
Figure 4:
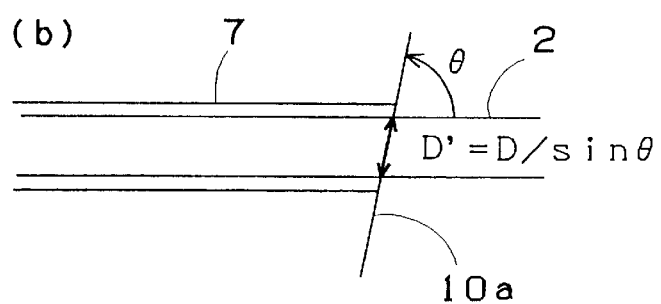

The imaginary line extending along the insertion ends of the straight grooves for the stripped end portions is not orthogonal but at an angle to the straight grooves 7. As shown FIG. 4, assuming that the distance is D when the imaginary line is orthogonal or the cross section of optical fiber is at a right angle, the distance D' when the cross section is at an angle is equal to $D/\sin\theta$ which is greater than D. Accordingly, the area for receiving a shearing stress may be increased as compared with the cross section at a right angle. As the optical fibers are arrayed such that they receive a smaller amount of the shearing stress, the optical fibers can be improved in the resistance to shearing stress.

Also, since the axis of the optical fibers are not orthogonal to the front or joint end to be joined with an optical element, any noise generated by the reflection of an optical signal on the joint end will be avoided. As the straight grooves for positioning and holding their respective optical fibers are arranged identical in the length to each other, the optical fibers can receive a uniform stress from the application of an adhesive for bonding their stripped portions. In particular, when optical fibers for polarized wave light which are highly susceptible to the physical stress are employed, their fiber array can remain uniform in the optical properties. Moreover, since the optical fibers extend equal throughout the length of the fiber holding recess, their sheathed portions can be held at a uniform force. The length for holding the sheathed portion of the optical fibers may be set to an optimum value for restricting the behavior of the optical fibers determined by thermal cycles, particularly the displacement along the optical axis. As the length for holding is uniform, all the optical fibers can be held at the optimum length. In this embodiment, the length is preferably 3 mm.

The greater the angle between the imaginary line L and the straight grooves, the greater the area of the optical fiber for receiving a shearing stress becomes. As the optical fiber suffers from relatively a less force of the shearing stress, it can be improved in the resistance to shearing stress. In view of the down sizing and the joining with an optical element, the angle should be smaller. It is hence desirable to have the angle of a range from 75 to 83 degrees. In this embodiment, the angle is 81 degrees.

Figure 2:
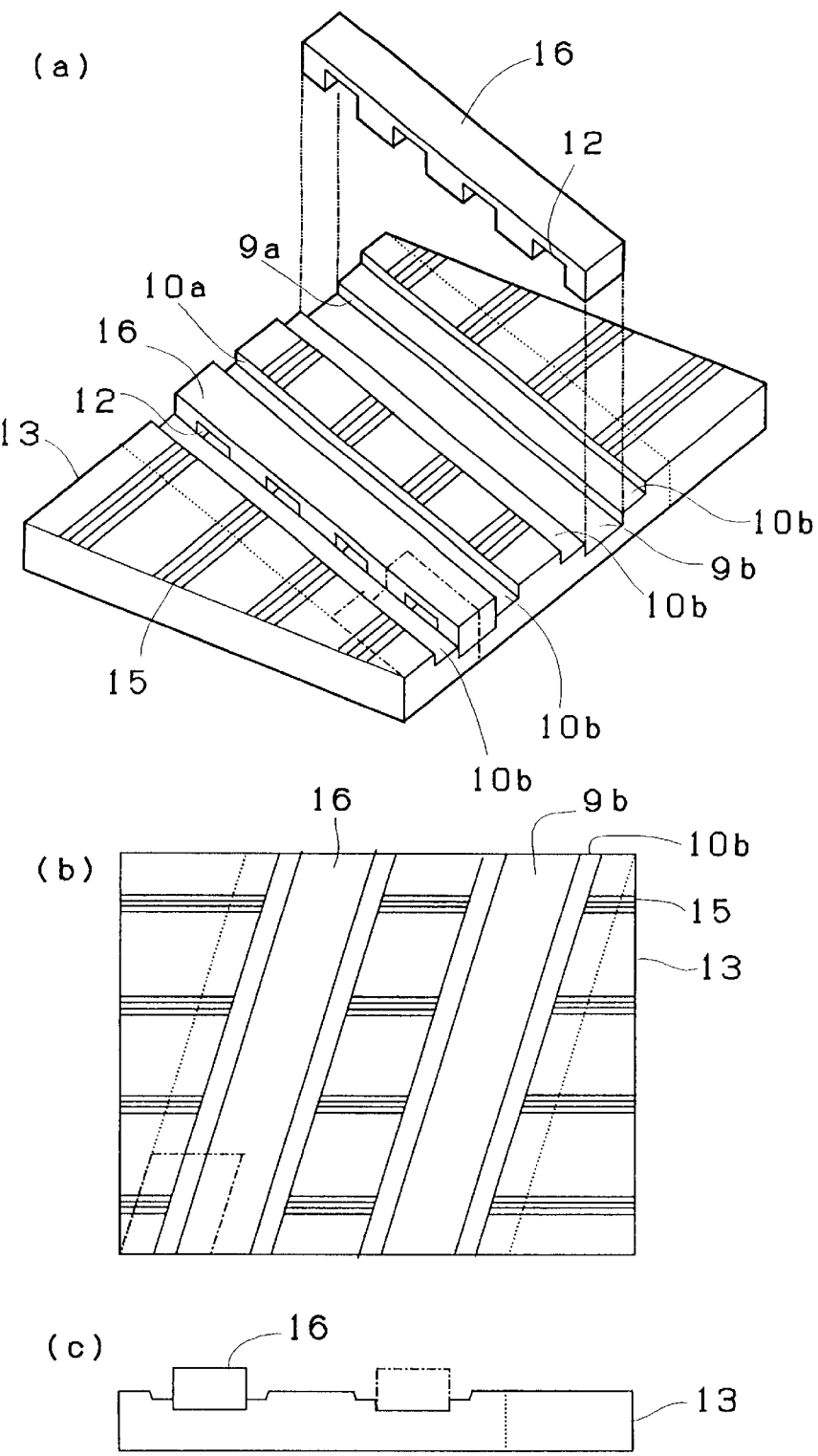

A method of fabricating the optical fiber array shown in FIG. 1 will now be described referring to FIG. 2. FIG. 2 illustrates a wafer acting as the fiber clamping member 1 of FIG. 1, in which FIGS. 2a, 2b, and 2c are a perspective view, a plan view, and a side view, respectively. The method starts with providing groups of straight grooves 15 parallelly in the flat surface of the wafer 13 made of a four-sided glass material. Shown are four groups of the four straight grooves 15. The grooves 15 may be provided by a known grinding technique.

Then, first step surfaces 10b are provided by a first step 10a to extend at an angle 45 to 85 degrees to the straight grooves 7. Also, second step surfaces 9b are provided by a second step 9a in the first step surfaces 10b to extend parallel with the first step surfaces 10b. The step surfaces are shown but not limited to two sets. The first step surface 10b serves as the fiber running space and the second step surface 9b serves as the fiber holding surface.

As a continuous member 16 incorporating a corresponding number of the sheathed portion holders on the wafer 13 is fitted and bonded to each second step surface 9b, the wafer shown in FIG. 2 is completed. The continuous member 16 has a number of recesses 12, provided therein arranged left to right continuously at a width equal to the pitch of each group of the straight grooves 7 by the same number as the group of the straight grooves 7, and arranged back to front continuously by the manner of two.

The method of fabricating the wafer is not limited to the above described steps but may be modified where the straight grooves are cut in after the step surfaces are formed.

The wafer 13 is then cut along the one-dot chain lines shown in FIG. 1 to separate each fiber clamping member 1 consisting of the base 3 and the sheathed portion holder 5. Then, optical fibers 2 are inserted and clamped on the base 3 with the sheathed portion holder 5. Finally, a clamping plate 4 formed separately is secured to the fiber clamping surface 8 to complete the optical fiber array. In this embodiment, 16 of the fiber clamping members are fabricated from one single wafer, hence providing 16 of the optical fiber arrays.

As the front end, the first step surface, and the second step surface of the fiber clamping member are arranged in parallel with each other, the plural optical fiber arrays can be fabricated from one single wafer without difficulty. If the optical fiber running space is not needed, the first step 10a and the second step 9a may be combined to one step.

Figure 3:
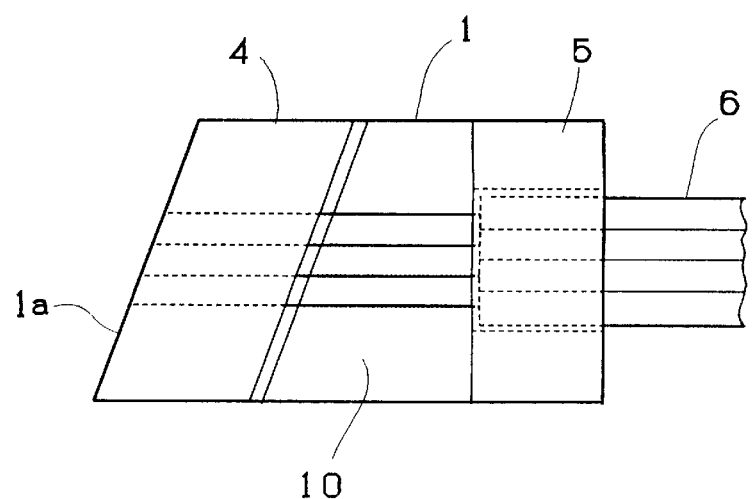
FIG. 3 is a plan view of another embodiment of the present invention.

FIG. 3 illustrates another optical fiber array according to the present invention in which the fiber holding surface is provided at a different angle from that shown in FIG. 1 as orthogonal to the straight grooves 7. It is not mandatory to have the fiber holding surface in parallel with the fiber clamping surface. Although a plurality of the fiber clamping members are easily and efficiently fabricated from one single wafer by parallel arrangement of the components as shown in FIG. 1, it is only essential to have a range of the angle between the imaginary line along the optical fiber insertion end of the straight grooves and the axes of the straight grooves from 45 degrees to 85 degrees. The front end of the fiber clamping member may not always extend in parallel with the imaginary line.

While a number of the straight grooves are provided in the fiber clamping member in the foregoing embodiments, a single straight groove may be enough when the optical fiber array uses one optical fiber.

As set forth above, the optical fiber array has the axes of the straight grooves extended not orthogonal to but at an angle to the imaginary line extending along the insertion end of the straight grooves for clamping the stripped end portions of the optical fibers. Consequently, as the area of the optical fibers for receiving shearing stress is increased, as compared with the orthogonal arrangement, or more particularly the shearing force per unit area on the optical fibers is minimized, the optical fibers can thus be improved in the resistance to shearing stress.

According to another feature of the present invention, in addition to the above-discussed feature, the joining end surface of the array for joining to an optical element does not extend at a right angle to the axes of the optical fibers, and thus inhibiting the generation of noises caused by the reflection of an optical signal on the joining end surface.

According to other features of the present invention, in addition to the above-discussed features, the straight grooves provided for clamping their respective optical fibers are uniform in the length. As the optical fibers accept uniformly the stress, the optical fiber array can be uniform in the optical properties even when a polarized wave light type of the optical fibers which is highly susceptible to the stress is used.

In addition to the above, the sheathed portions of the optical fibers can be held uniformly.

According to the method of fabricating the optical fiber array of the present invention, the fiber clamping members can be fabricated from a single wafer easily and efficiently.

What is claimed is:

1. An optical fiber array having an optical fiber clamping member for clamping a stripped end portion of at least one optical fiber in at least one corresponding straight groove formed in a portion of a substrate and simultaneously holding a sheathed portion of the optical fiber formed in another portion of the substrate proximate to the stripped end portion of the optical fiber to align a distal end of the stripped end portion, wherein the substrate has upper, lower, and opposite first and second side surfaces, and the substrate further includes an insertion end face, and an angle between a surface of the insertion end face extending between the first and second side surfaces and perpendicular to the upper and lower surfaces at the end of the straight groove and the axis of the straight groove formed in the substrate is within a range of 45 degrees to 85 degrees.

2. The optical fiber array according to claim 1, wherein an angle between a front end of the optical fiber clamping member and the axis of the straight groove is within a range of 45 degrees to 85 degrees, said optical fiber clamping member front end being flush with the distal end of the stripped end portion of the optical fiber.

3. The optical fiber array according to claim 1, wherein said at least one straight groove comprises a plurality of straight grooves, and said straight grooves are uniform in length.

4. The optical fiber array according to claim 1, wherein a rear end of the optical fiber clamping member extends in parallel with the insertion end face of the straight groove into which the stripped end portion of the optical fiber is inserted.

5. The optical fiber array according to claim 1, wherein said at least one straight groove comprises a plurality of straight grooves, and an angle between an imaginary line linearly connecting insertion ends of the straight grooves and each respective axis of the straight grooves formed in the substrate is within a range of 45 degrees to 85 degrees.

6. A method of fabricating an optical fiber array having an optical fiber clamping member for clamping a stripped end portion of at least one optical fiber in at least one corresponding straight groove formed in a portion of a substrate and simultaneously holding a sheathed portion of the optical fiber formed in another portion of the substrate proximate to the stripped end portion of the optical fiber to align a distal end of the stripped end portion, comprising the steps of:

providing a wafer including upper, lower and opposite first and second side surfaces, and having at least one straight groove extending in an axial direction of the substrate and arranged parallel to at least one other straight groove, and at least one group of step surfaces extending between the first and second side surfaces and arranged parallel to at least one other group of step surfaces, the group of step surfaces being formed at an angle with respect to the straight grooves, and the angle being within a range of 45–85 degrees;

mounting at least one continuous sheath holding member on each of the step surfaces, the continuous sheath holding member having a corresponding number of recesses formed therein to house the sheathed portions of optical fibers positioned in the straight grooves, and provided at locations corresponding to portions of the straight grooves in which stripped end portions of the optical fibers are to be held;

bonding each of the continuous sheath holding members to the corresponding step surface portions and cutting the wafer together with the continuous sheath holding members, step surfaces and the straight grooves to separate the fiber clamping member into a chip form; and mounting and clamping the optical fibers in the optical fiber clamping member to align the distal ends of the optical fibers.

\* \* \* \* \*

UNITED STATES PATENT AND TRADEMARK OFFICE
CERTIFICATE OF CORRECTION

PATENT NO.     : 6,577,803 B2
DATED          : June 10, 2003
INVENTOR(S)    : Akira Matsumoto and Masashi Fukuyama It is certified that error appears in the above-identified patent and that said Letters Patent is hereby corrected as shown below:

<u>Title page,</u>
Item [57], ABSTRACT, please delete the abstract in its entirety and replace with the following:

-- An optical fiber array is provided which allows each optical fiber to be rarely sheared down by the action of shearing stress and inhibits the reflection of an optical signal on the interface at a joint between the optical array and an optical element. An imaginary line L extends linearly along the proximal end of straight grooves 7 housing the stripped end portion 2a of the optical fibers 2, which are provided in a fiber clamping member 2 to align the distal ends of the optical fibers 2 at uniform pitch. An angle between imaginary line L and the axes of the straight grooves 7 ranges from 45 degrees to 85 degrees. Also, the front end 1a of the fiber clamping member 1, which serves as a joining end, is arranged in parallel with imaginary line L. --

Signed and Sealed this

Sixteenth Day of September, 2003

JAMES E. ROGAN
*Director of the United States Patent and Trademark Office*